United States Patent
Törnkvist et al.

(10) Patent No.: US 9,461,829 B2
(45) Date of Patent: Oct. 4, 2016

(54) METHOD AND APPARATUS FOR CONTROLLING CHARGING IN A COMMUNICATION NETWORK

(75) Inventors: Robert Törnkvist, Karlshamn (SE); Marcus Karlsson, Karlskrona (SE); Peter Lindau Nordhammer, Lyckeby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 281 days.

(21) Appl. No.: 14/368,418

(22) PCT Filed: Dec. 27, 2011

(86) PCT No.: PCT/SE2011/051595
§ 371 (c)(1),
(2), (4) Date: Jun. 24, 2014

(87) PCT Pub. No.: WO2013/100829
PCT Pub. Date: Jul. 4, 2013

(65) Prior Publication Data
US 2014/0348030 A1    Nov. 27, 2014

(51) Int. Cl.
*H04L 12/14* (2006.01)
*H04M 15/00* (2006.01)

(52) U.S. Cl.
CPC ....... *H04L 12/1457* (2013.01); *H04L 12/1403* (2013.01); *H04L 12/1435* (2013.01);
(Continued)

(58) Field of Classification Search
CPC .......... H04L 12/1457; H04L 12/1403; H04L 12/1435; H04L 12/1439; H04M 15/60; H04M 15/66; H04M 15/73; H04M 15/775; H04M 15/78; H04M 15/785; H04M 15/80; H04M 15/8228
See application file for complete search history.

(56) References Cited

U.S. PATENT DOCUMENTS 7,548,743 B2 *  6/2009  Cai .................. H04L 12/14
                                                    370/466
2003/0187800 A1 * 10/2003 Moore ............. G06Q 20/085
                                                    705/52
(Continued)

FOREIGN PATENT DOCUMENTS

WO    2010112080 A1    10/2010

OTHER PUBLICATIONS

Unknown, Author, "3GPP TS 32.299, V10.1.0 (Mar. 2011)", 3rd Generation Partnership Project; Technical Specification Group Services and System Aspects; Telecommunication management; Charging management; Diameter charging applications (Release 10), Mar. 2011, pp. 1-148.
(Continued)

*Primary Examiner* — Chi H Pham
*Assistant Examiner* — Weibin Huang
(74) *Attorney, Agent, or Firm* — Patent Portfolio Builders, PLLC (57) ABSTRACT

A method and apparatus for controlling a present service charging session for charging service usage in a communication network. The method comprises receiving a first request for grant of a reservation service unit quota from a charging client, the first request including at least data identifying an account to charge for the service usage. A first granted service unit quota for the first request is determined and a first carry-over service units quota from a previous service charging session associated with the identified account is accessed. A first reservation service unit quota is determined by deducting the first carry-over service units quota from the first granted service unit quota. According to the method it is reserved for the first reservation service unit quota from the account and the first granted service unit quota is sent to the charging client.

20 Claims, 7 Drawing Sheets

(52) U.S. Cl.
CPC .......... *H04L12/1439* (2013.01); *H04M 15/60* (2013.01); *H04M 15/66* (2013.01); *H04M 15/73* (2013.01); *H04M 15/775* (2013.01); *H04M 15/78* (2013.01); *H04M 15/785* (2013.01); *H04M 15/80* (2013.01); *H04M 15/8228* (2013.01); *H04M 15/43* (2013.01)

(56) References Cited

U.S. PATENT DOCUMENTS

| | | | |
|---|---|---|---|
| 2004/0247100 A1* | 12/2004 | Hakala | G06Q 20/102 379/114.01 |
| 2011/0161216 A1* | 6/2011 | Ahlgren | G06Q 20/102 705/34 |
| 2013/0132854 A1* | 5/2013 | Raleigh | G06F 3/0482 715/738 |

OTHER PUBLICATIONS

Unknown, Author, "3GPP TS 32.299, V10.4.0", 3rd Generation Partnership Project; Technical Specification Group Services and System Aspects; Telecommunication Management; Charging Management; Diameter charging applications (Release 10), Dec. 2011, pp. 1-149.

3GPP TS 32.240 V11.0.0 3rd Generation Partnership Project; Technical Specification Group Services and System Aspects; Telecommunication management; Charging management; Charging architecture and principles (Release 11), Mar. 2011, pp. 1-45.

3GPP TS 32.299 V11.0.0 3rd Generation Partnership Project; Technical Specification Group Services and System Aspects; Telecommunication management; Charging management; Diameter charging applications(Release 11), Jun. 2011, pp. 1-149.

Calhoun P. et al. "Diameter Base Protocol," Network Working Group, Category: Standards Track, pp. 1-129.

Hakala H. et al. "Diameter Credit-Control Application," Network Working Group Category: Standards Track, pp. 1-100.

* cited by examiner

METHOD AND APPARATUS FOR CONTROLLING CHARGING IN A COMMUNICATION NETWORK

FIELD OF INVENTION

The present invention relates to controlling charging in a communication network and more particularly to a method and apparatus for controlling a present service charging session for charging service usage.

BACKGROUND

In telecommunication networks charging for usage is usually done for every started period, called charging interval. The charging interval can be from one second to several minutes for calls and ranging from bytes to megabytes for data. It is common that a subscriber is charged for every started minutes of a call. For example if the subscriber talks for one minute and one second the subscriber will have to pay for two full minutes.

To be able to handle data usage there is a need to define when the usage has stopped since this is not as clear as detecting an on-hook for a voice call. To solve this the 3:rd Generation Partnership Project (3GPP) standardization has introduced a parameter that can be used to identify that traffic (that consumes a granted quota) has stopped. This parameter is called Quota-Holding-Time (QHT) and is specified by 3GPP TS 32.299 V10.1.0 (2011-03).

The parameter is used on the Ro reference point in the 3GPP charging architecture. The Ro reference point is for example used for charging of data bearer traffic and different IP Multimedia Subsystem (IMS) services. The Ro reference point is between the charging client and Online Charging System (OCS).

If no traffic associated with a consumption quota granted to a charging client by a charging server is observed for the duration of the QHT, the charging client understands that the traffic has stopped and the consumption quota is returned to the server.

By using Quota-Holding-Time the telecommunications network operator has the possibility to not have reservations allocated on the subscribers account for services that is not currently used. Normally there is one charging session for example for one Packet Data Protocol (PDP) context. If the subscriber is using several services during the lifetime of the charging session there can be several reservations on the subscriber account.

If Quota-Holding-Time, or a similar timer set locally in the charging client, is not used this will result in a large part of the subscriber's balance of funds being blocked for those reservations. As a result, services may be denied because of a virtual lack of available funds, although funds are available but distributed and allocated as consumption quota for different charging sessions.

For voice calls the duration is usually relatively easy to estimate and in most cases optimize the calls so that the time is utilized optimally. This is to some extent also true for data. The issue here is that the user normally does not have full control over when a charging session is considered started or stopped. A solution to this today is to have it based per bill period (e.g. month) but this is difficult when having an online charged subscriber (e.g. prepaid) since they expect to have an updated and correct statement immediately.

However, the use of Quota-Holding-Time or similar methods creates another problem. Consider a Quota-Holding-Time set to five minutes. In a possible scenario the subscriber is web browsing and a page is downloaded. The subscriber may read the page for a duration that is longer than five minutes. Due to the QHT timer the service charging session, where a service charging session is defined as the session for charging the service usage until the service usage is identified as stopped using for example Multiple Services Credit Control (MSCC) as specified by the Internet Engineering Task Force (IETF) RFC 4006 as a type of sub-sessions, is terminated.

At the termination the used units are deducted and any unused quota is returned to subscribers account. The deduction is rounded upwards to the charging interval i.e. the granularity used for charging of the used units. The charging interval may for example be 1 kilobyte and the used volume is thereby charged for every started kilobyte.

The subscriber may then select to click on next link and a new web page is downloaded and a new service charging session started, and so on for each subsequent page. Each time the service charging session is terminated the service usage is rounded upwards to the charging interval. When summarizing the total usage the subscriber may thereby have paid significantly more than would the service charging session been up all the time.

The cause to the problem is that service charging sessions are started and terminated several times during a charging session. The subscriber experience the web surfing as one usage session but the OCS is handling it as several smaller service charging sessions.

For a voice call the rounding to the next charging interval is made at the end of the call when the subscriber decides to terminate the call. A similar behavior is wanted for a data session in that rounding should not be done several times during a data session just because of signaling optimization and instead leading to an overcharge.

Also, the charging interval must be configurable based on the operator's business requirements, in the same way the operator in many cases decides to have a charging interval of one minute for voice. For example the operator must be able to configure for example charging interval to 50 KB for roaming data (this is a normal interval for the roaming case). The real usage is normally measured in higher granularity (i.e. more detailed) than the charging interval which gives the affect as described in above example.

As has been illustrated above, QHT or similar timers are used to end a service charging session at inactivity and to return the allocated reservation to be usable for other sessions as to avoid a virtual lack of funds and the resulting service denial. Inactivity may, as has been describe, be erroneously deduced because of the user still e.g. reading a web page but may also result from the user terminal losing its connection due to e.g. out of radio coverage of a mobile device.

As has also been shown such ending of a service charging session may cause excess charging of the user causing a premature extinction of funds thereby also resulting in denial of service.

A problem is thus that excess charging of a subscriber's accounts due to unintentional service charging session interruptions causes premature denial of service when the account is extinct.

SUMMARY OF INVENTION

An object of the invention is to provide a method and apparatus for controlling a present service charging session for charging service usage in a communication network mitigating the problem that excess charging of a subscriber's accounts due to unintentional service charging session interruptions causes premature denial of service when the account is extinct.

One aspect of the invention relates a method performed by a charging control node for controlling a present service charging session for charging service usage in a communication network. The method comprises receiving a first request for grant of a reservation service unit quota from a charging client, the first request including at least data identifying an account to charge for the service usage. A first granted service unit quota for the first request is determined and a first carry-over service units quota from a previous service charging session associated with the identified account is accessed. A first reservation service unit quota is determined by deducting the first carry-over service units quota from the first granted service unit quota. According to the method it is reserved for the first reservation service unit quota from the account and the first granted service unit quota is sent to the charging client. Further, a clearing request is received from the charging client including data enabling a first used amount of service units to be determined. An outstanding service unit quota is determined by deducting the first carry-over service unit quota from the first used amount of service unit and the outstanding service unit quota from the account is deducting for.

It is an advantage that for example mechanisms for reducing resource usage in the communication network, such as for example Quota-Holding-Time defined in 3GPP 32.299, may be used and still get a correct charging of used services thereby avoiding premature denial of service when the account is extinct.

Another aspect of the invention relates to a charging control node for controlling a present service charging session for charging service usage in a communication network comprising an interface unit adapting the charging control node for receiving a first request for grant of a reservation service unit quota from a charging client, the first request including at least data identifying an account to charge for the service usage. The charging control node also comprises a determination unit adapting the charging control node for determining a first granted service unit quota for the first request; accessing a first carry-over service unit quota from a previous service charging session associated with the identified account; determining a first reservation service unit quota by deducting the first carry-over service unit quota from the first granted service unit quota; reserving for the first reservation service unit quota from the account. The interface unit is further adapting the charging control node for sending the first granted service unit quota to the charging client and receiving a clearing request from the charging client including data enabling a first used amount of service units to be determined. The determination unit is further adapting the charging control node for determining an outstanding service unit quota by deducting the first carry-over service unit quota from the first used amount of service unit and deducting for the outstanding service unit quota from the account.

A further aspect of the invention relates to a charging control apparatus having a processor and a memory. The memory is storing instructions that, when executed by the processor, cause the apparatus to receive a first request for grant of a reservation service unit quota from a charging client, the first request message including at least data identifying an account to charge for the service usage; determine a first granted service unit quota for the first request; access a first carry-over service units quota from a previous service charging session associated with the identified account; determine a first reservation service unit quota by deducting the first carry-over service units quota from the first granted service unit quota; reserve for the first reservation service unit quota from the account; send the first granted service unit quota to the charging client; receive a clearing request from the charging client including data enabling a first used amount of service units to be determined; determine an outstanding service unit quota by deducting the first carry-over service units quota from the first used amount of service unit and deduct for the outstanding service unit quota from the account.

Embodiments of the invention will now be described in more detail with reference to the enclosed drawings.

DETAILED DESCRIPTION OF THE INVENTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
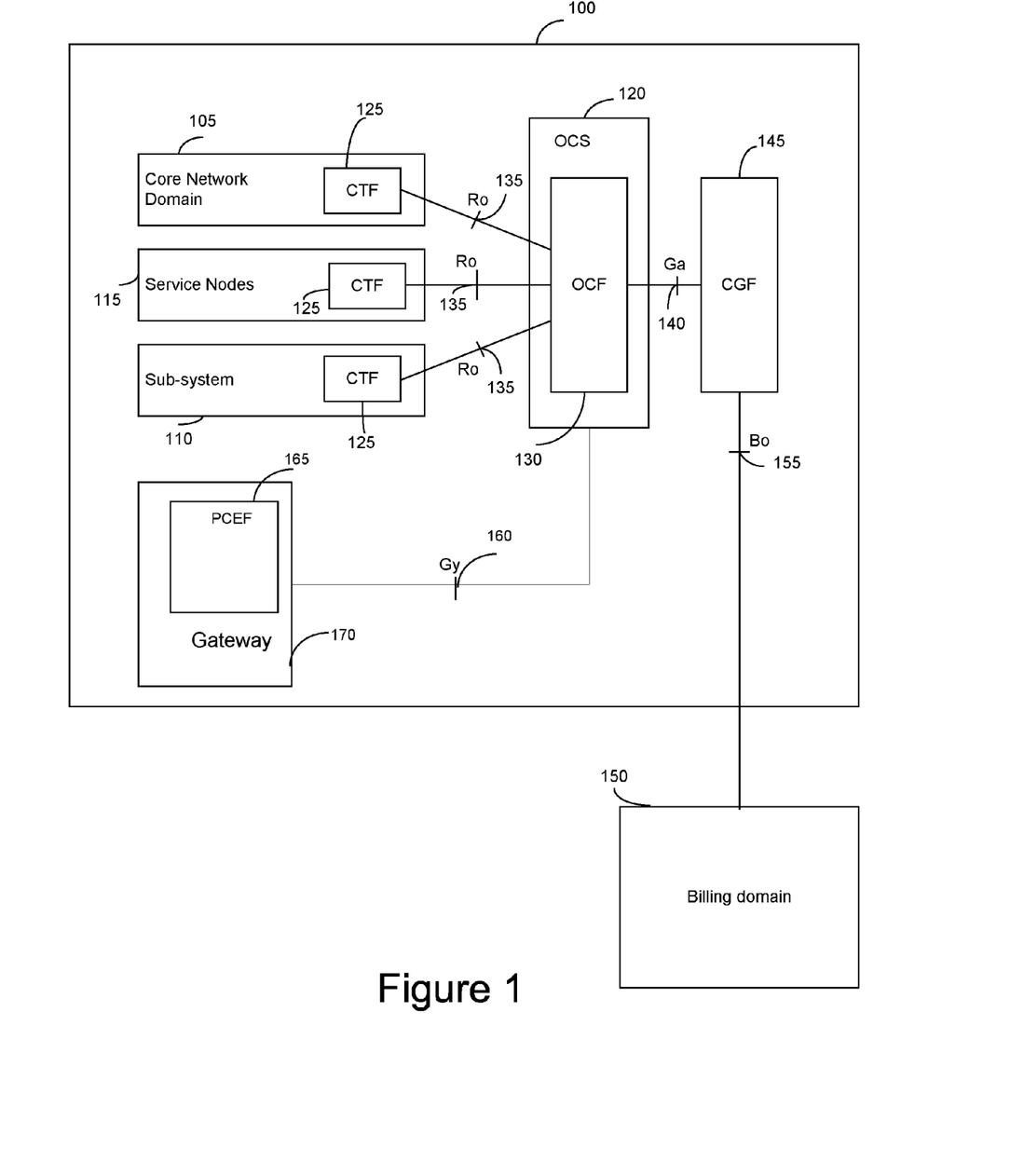
FIG. 1 is a block diagram showing an example online charging architecture wherein the invention is useful.

FIG. 1 is a block diagram showing an example online charging architecture wherein the invention is useful.

A Communication network 100 provides functions that implement online charging mechanisms as charging clients in charging trigger functions (CTF) of Network Elements (NE) on the core network 105—e.g. Evolved Packet Core (EPC), subsystem 110—e.g. IP Multimedia Subsystem (IMS) and service 115—e.g. Multimedia Messaging System (MMS) levels. In order to support these charging mechanisms, the network performs real-time monitoring of required network resource usage on the above three levels in order to detect relevant chargeable events.

In online charging, a subscriber account holding subscriber related data as balance level of monetary funds, services subscribed to etc, located in an Online Charging System (OCS) 120, is queried prior to granting permission to use the requested network resource(s).

Typical examples of network resource usage are a voice call of certain duration, the transport of a certain volume of data, or the submission of a multimedia message of a certain size. The network resource usage requests may be initiated by a User Equipment UE (not shown) or by the network 100.

Online charging is a process where charging information for network resource usage is collected concurrently with that resource usage. However, authorization for the network resource usage is obtained by the network prior to the actual resource usage occurs. This authorization is granted by the OCS upon request from the network.

When receiving a network resource usage request the Charging Trigger Function (CTF) 125 of the network assembles the relevant charging information and generates a charging event towards an Online Charging Function (OCF) 130 of the OCS in real-time. The OCS then returns an appropriate resource usage authorization. The resource usage authorization may be limited in scope (e.g. service unit quota of volume of data or duration), therefore the authorization may have to be renewed from time to time as long as the network resource usage persists.

The charging event is forwarded to the OCF in order to obtain authorization including a service usage quota for the chargeable event/network resource usage requested by the UE or network. The CTF is also able to track the availability of resource usage permission ("quota supervision") during the network resource usage.

Online charging in the Circuit Switched (CS) and Packet Switched (PS) domains may also be performed using the Customized Applications for Mobile networks Enhanced Logic (CAMEL) Application Part (CAP) protocol and the CAP reference point from the Mobile Switching Centre (MSC) and Serving GPRS Support Node (SGSN), respectively, to the OCF. Other network elements may employ an Ro reference point 235 for online charging using Diameter Credit Control application. Similarly, Wo reference point may be employed for Wireless Local Area Network (WLAN), Gx and Gy reference points may be employed for Policy and Charging Control (PCC) according to the 3rd Generation Partnership Project 3GPP as described in TS 23.203 V10.2.1 (2011-01).

The Ro reference point from the CTF 125 to the OCF 130 is intended for the transport of charging events for online charging. A Ga 140 reference point is the interface between the OCF and a Charging Gateway Function (CGF) 145 which connects a Billing Domain (BD) 150 over a Bo 155 reference point.

The Ro reference point supports interaction between a Charging Trigger Function and an Online Charging Function. The following information may flow across this reference point:

Charging events for online charging from the CTF to the OCF.

Receive acknowledgements for these charging events from the OCF to the CTF. The acknowledgement grants or rejects the network resource usage requested in the charging event, according to the decision taken by the OCS.

The CAP reference point provides similar functionality for online charging as Ro, however, it is based on CAMEL techniques.

Different mappings of the online charging functions, CTF, OCF and CGF, onto physical implementations are possible.

Each CTF may have an OCF address list to which it can send its charging events and/or charging requests.

Figure 2:
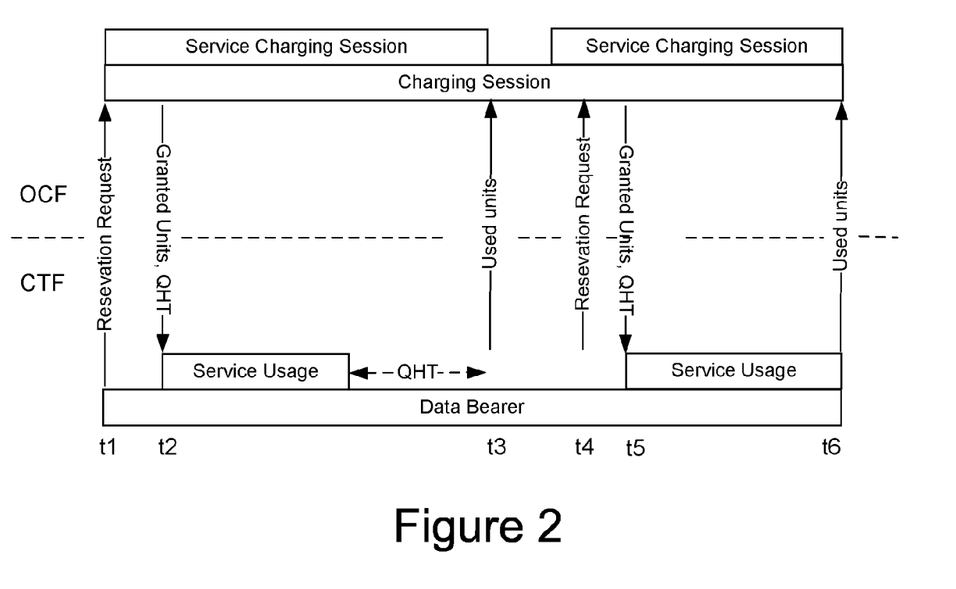
FIG. 2 is a block diagram showing session charging according to an exemplary embodiment of the invention.

FIG. 2 is a block diagram showing session charging according to an exemplary embodiment of the invention.

A charging session is started in the OCF at t1 as a result of a request for a reservation service unit quota (RSUQ) from a CTF, for example in a Policy and Charging Enforcement Function (PCEF), following for example the setup of a data bearer at the client. At this point a charging session state is created. The charging session state is used as a container for any future surviving session states. This is to support parallel charging sessions so that one service session in one charging session does not affect a service session in another charging session. In case sub-sessions, for example MSCC as described by IETF RFC 4006 is used, also a service charging session is started as a result of the reservation request from the CTF. At time t2 the OCF responds with a granted reservation service unit quota and optionally a quota holding time (QHT), e.g. as defined by 3GPP TS 32.299 V10.1.0 (2011-03), to the CTF and the service usage may be started at the client. At time t3 the service charging session is terminated because QHT times out at the CTF following a QHT timeout following ceased service usage. The number of used units and the number of charged units for the service session, or a Carry-over amount of Service Units (CSU) computed from these, are stored in the surviving session state. At time t4 a new service usage is started for the same service which triggers a new request for RSUQ from the CTF and establishment of a new service charging session at the OCS. The number of used units' and the number of charged units' values are fetched from the session state. The amount of units used in the new reservation is calculated in the following formula:

$$\text{Units to be granted in reservation} = \text{new requested number of units} - (\text{charged units} - \text{used units}).$$

The granted reservation service unit quota is returned to the CTF and service usage is allowed to continue at time t5. At time t6 the service session is terminated because data bearer is terminated and the used service units is reported to the OCS. The amount of service units to deduct from the account is calculated in the following formula:

Units to be deducted for = new used number of units − (charged units − used units). In case usage of carry-over units are not allowed between charging sessions the surviving session state may now be deleted. It is optionally possible to reset the surviving session state with some interval to handle the case when subscriber is always connected, for example nightly, monthly or synchronized with billing cycle. It is also possible to configure for how long the service can be unused before the reset is done.

Figure 3:
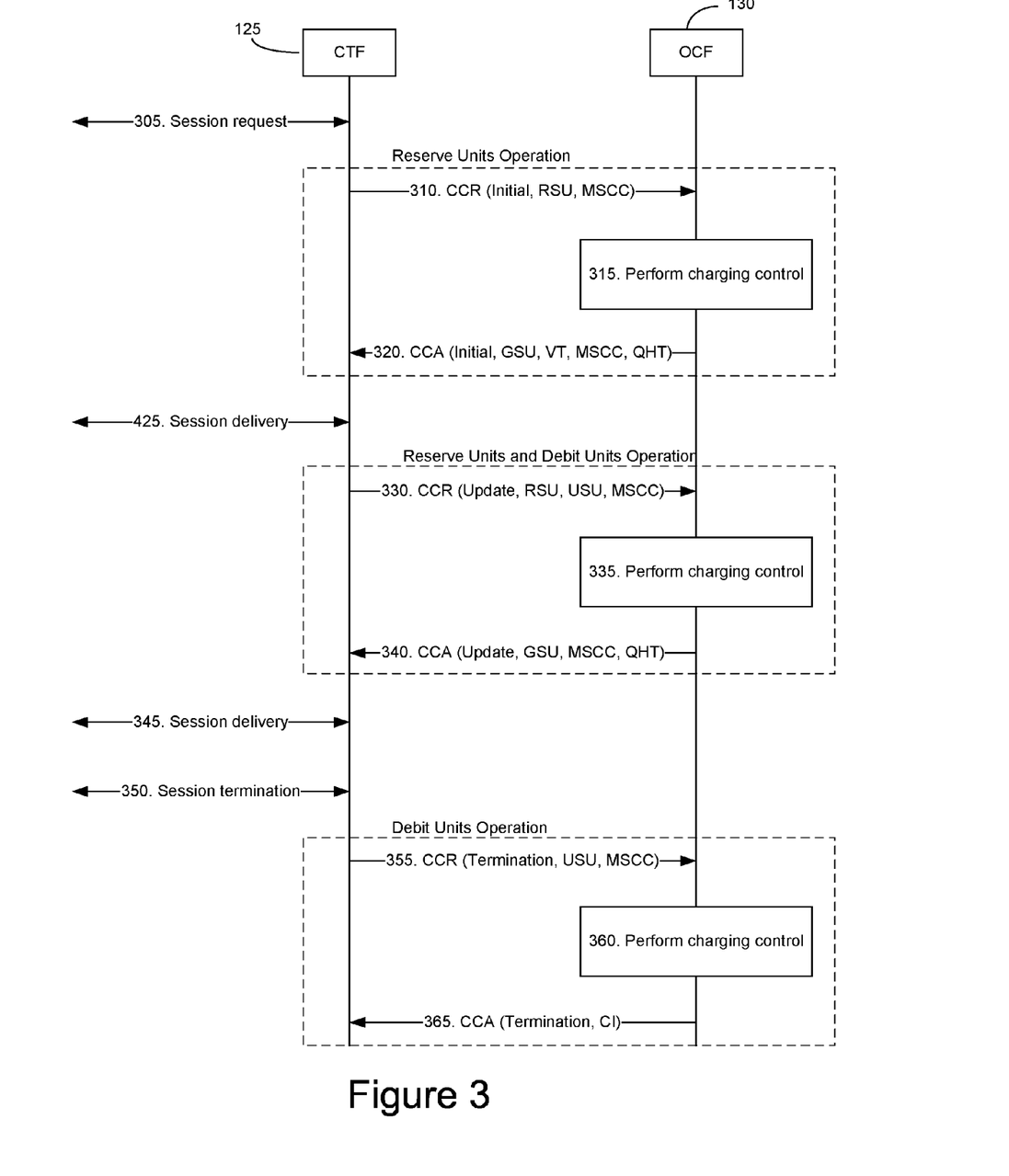
FIG. 3 is a message sequence chart showing session charging with unit reservation according to an exemplary embodiment of the invention.

FIG. 3 is a message sequence chart showing session charging with unit reservation according to an exemplary embodiment of the invention.

According to 3GPP TS 32.299 on-line credit control can be structured as using two basic logical operations: Debit Units and Reserve Units.

Debit Units Request is sent from CTF to OCF. After receiving a service request from the subscriber, the CTF sends a Debit Units Request to the OCF. The CTF may either specify a service identifier (centralized unit determination) or the number of units requested (decentralized unit determination). For refund purpose, the CTF sends a Debit Units Request to the OCF as well.

Debit Units Response is sent from OCF to CTF. The OCF replies with a Debit Units Response, which informs the CTF of the number of units granted as a result of the Debit Units Request. This includes the case where the number of units granted indicates the permission to render the requested service. For refund purpose, the OCF replies with a Debit Units Response.

Reserve Units Request is sent from CTF to OCF and is a request to reserve a number of units for the service to be provided by a CTF. In case of centralized unit determination, the CTF specifies a service identifier in the Reserve Unit Request, and the OCF determines the number of units requested. In case of decentralized unit determination, the number of units requested is specified by the CTF.

Reserve Units Response is sent from OCF to CTF. The response from the OCF informs the CTF of the number of units that were reserved for as a result of the "Reserve Units Request".

Session charging with unit reservation may use the Session Based Credit Control procedure specified in RFC 4006 by the IETF. In session charging with unit reservation, when the "Debit Units" and "Reserve Units" operations are both needed, they may be combined in one message.

The consumed units are deducted from the subscriber's account after service delivery. Thus, the reserved and consumed units are not necessarily the same. Using this operation, it is also possible for the CTF to modify the current reservation, including the return of previously reserved units.

The corresponding IETF RFC 4006 Diameter Credit Control Application (DCCA) messages for the Debit/Reserve Unit Request operation is Credit-Control-Request (CCR) and for the Debit/Reserve Unit Response operation is Credit-Control-Answer (CCA).

DCCA specifies an approach based on a series of "interrogations":
  Initial interrogation.
  Zero, one or more interim (also called intermediate) interrogations.
  Final interrogation.

In addition to a series of interrogations, also a one time event (interrogation) can be used e.g. in the case when service execution is always successful.

All of these interrogations use CCR and CCA messages. The CCR for the "interim interrogation" and "final interrogation" reports the actual number of "units" that were used, from what was previously reserved for. This determines the actual amount debited from the subscriber's account.

In step 305 the CTF 125 of a network element, for example a PCEF receives a session initiation request. The session initiation may be done either by a user equipment or another network element.

In order to perform Reserve Units operation for a number of units (monetary or non-monetary units), the CTF sends a CCR with Credit Control CC-Request-Type set to INITIAL_REQUEST to the OCF 130 of an OCS in step 310. As a result of the CCR from the charging client a charging session is started. If known, the network element may include Requested-Service-Unit (RSU) as monetary- or non monetary units (e.g. service units, data volume, time and events) in the request message.

At this point a charging session state is created. The charging session state is used as a container for any future surviving session states. This is done to support parallel charging sessions but also so that one service charging session in one charging session does not affect a service charging session in the same charging session.

A service charging session may be implemented using Multiple Services Credit Control (MSCC). MSCC is specified by the IETF RFC 4006 as a type of sub-sessions. MSCC shall not be mixed up with the sub-sessions of RFC 4006 as specified in chapter 5 of RFC 4006, which may also be used.

The CCR may in accordance with RFC 4006 paragraph 8.16 include a MSCC Attribute Value Pair (AVP) which contains the AVPs related to the independent credit-control of multiple services. Each instance of an MSCC AVP in the CCR carries units related to one or more services or related to a single rating group.

The Multiple-Services-Control AVP may include: Granted-Service-Unit; Requested-Service-Unit; Used-Service-Unit; Tariff-Change-Usage; Service-Identifier; Rating-Group; G-S-U-Pool-Reference; Validity-Time; Result-Code and Final-Unit-Indication.

Service charging session is the session for charging the service until the service is identified as stopped.

When MSCC is used the service charging session is started as the result of a CCR request including an MSCC AVP from the charging client, for example PCEF, which contains a request for service units. A surviving session state is created for the service charging session at the OCF.

In step 315 a granted service unit quota is determined. If the service cost information is not received by the OCS, the OCS determines the price of the desired service according to service specific information received by issuing a rating request to a rating function of the OCS. If the credit balance is sufficient, the OCS reserves the amount corresponding to the service units quota from the subscriber's account. If the cost of the service is included in the request, the OCS may directly reserves the specified monetary, it may also rate the event for add-on charges or discounts.

Once the reservation has been made, the OCS returns CCA message with CC-Request-Type set to INITIAL_REQUEST to the CTF of the network element in step 320 in order to authorize the service execution. Granted-Service-Unit (GSU) and possibly Cost-Information indicating the cost of the service and Remaining-Balance are included in the CCA message. The OCS may return a Validity-Time (VT) with value field set to a non-zero value. The OCS may indicate in a Low-Balance-Indication that the subscriber account balance has fallen below a predefined threshold of this account. If MSCC is used the response also includes the MSCC response AVPs including quotas per service charging session. A Quota-Holding-Time idle timeout as specified by 3GPP TS 32.299 V10.10.0 (2011-03) paragraph 6.5.1.1 may further be included with the CCA. The OCS may specify an idle timeout associated with a granted quota using the Quota-Holding-Time AVP. If no traffic associated with the quota is observed for this time, the charging client/CTF determines the traffic as stopped and the quota is returned to the server Thus, the service charging session is terminated because QHT times out. If the QHT is not provided by the CCA messages a local quota holding time can employed by the charging client.

Content/service delivery starts in step 325 and the reserved units are concurrently controlled by the CTF.

During session delivery, in order to perform Debit Units and subsequent Reserve Units operations, the network element sends a CCR with CC-Request-Type set to UPDATE_REQUEST, to report the Used-Service-Unit (USU) and request additional service units using an RSU, respectively, in step 330. The CCR message with CC-Request-Type set to UPDATE_REQUEST is sent by the CTF of the network element between a INITIAL_REQUEST and TERMINATION_REQUEST either on request of the credit control application within the validity time or if the validity time is elapsed. If known, the network element may include Requested-Service-Unit as monetary or non monetary units in the request message. USU is complemented in the CCR message to deduct units from both the subscriber's account and the reserved units, respectively.

If MSCC is used, a CCR may include 1 . . . n MSCC AVPs. The MSCC AVP may further include a Reporting-Reason AVP indicating the QHT has timed out for a MSCC granted in step 320. Such MSCC AVP can be included in a CCR including for example RSU as previously described but a CCA may also be used only in order to convey an MSCC terminating a service charging session due to QHT time out.

In step 335 an USU is first analyzed and the corresponding amount is deducted from the account. If the service cost information is not received by the OCS, the OCS determines the price of the desired service according to the service specific information received by issuing a rating request to the rating function. If the credit balance is sufficient, the OCS reserves the amount from the subscriber's account. If the cost of the service is included in the request, the OCS directly reserves the specified monetary amount. The OCS may also rate the event for add-on charges or discounts.

An MSCC termination can be done due to the Quota-Holding-Time idle timeout. If no traffic associated with the quota is observed for this time, the charging client/CTF determines the traffic as stopped and the quota is returned to the server as implied by an USU within the MSCC AVP.

Thus, the service charging session is terminated because QHT times out.

Although an MSCC is terminated due to a QHT time out the charging amount deducted from the account should not be affected by the optimization done by using the Quota-Holding-Time parameter. For example a subscriber is charged 1.50€ for every started megabyte (MB) of data transmission. The user then transmits 1.5 MB which would result in a remainder of 0.5 MB. The rated charge would be for the 1:st MB is 1.50+cost for the 0.5 MB i.e. 1.50 gives a total cost of 3€ . Taking 3/1.50 and this gives 2 MB and the remainder (or unused quota) is then 2−1.5 which is 0.5 MB. This remainder value, or the used units USU as well as the charged units for the service session are stored in the surviving session state for usage by later charging or service charging sessions.

Once the deduction and reservation have been made, the OCS returns Credit-Control-Answer message with CC-Request-Type set to UPDATE_REQUEST to the network element in step 340, in order to allow the content/service delivery to continue, new Granted-Service-Unit (GSU), possibly Cost-Information (CI) indicating the cumulative cost of the service, Remaining-Balance, and MSCC, are included in the Credit Control-Answer message. The OCS may include in the CCA message a Final-Unit-Indication (FUI) to indicate the final granted units. The OCS may indicate in a Low-Balance-Indication that the subscriber account balance has fallen below a predefined threshold of this account. Also a QHT AVP may be included.

Session delivery continues and the reserved units are concurrently controlled by the CTF in step 345.

The session is terminated at the CTF of the network element in step 350.

The network element sends CCR with CC-Request-Type set to TERMINATION_REQUEST to terminate the active credit control session and report the used units in step 355. If used, also MSCC is included.

The termination can be done due to a Quota-Holding-Time idle timeout. If no traffic associated with the quota is observed for this time, the charging client determines the traffic as stopped and the quota is returned to the server as implied by the USU. Thus, the charging session is terminated because QHT times out.

The OCS deducts for the used units from the account. Unused reserved units are released, if applicable, in step 360. Similarly to termination of an MSCC in step 330, a remainder or the used units USU as well as the units charged for the service session are stored in the surviving session state for usage by subsequent charging sessions.

During the charging session, further CCR UPDATE_REQUEST as in step 330 may take place initiating new MSCC service charging sessions. A single CCR UPDATE_REQUEST may terminate 1 . . . N MSCCs and initiate 1 . . . N new MSCCs. The remainder, or used units' and charged units' values are fetched from the surviving session state. The amount of units used in the new reservation is calculated as:

Units to be used in reservation=new requested units−
(charged units−used units)

Once an MSCC service charging session is terminated, for example because the data bearer is terminated and the charging session thereby terminated, the amount of units used in the deduction is calculated in the following formula:

Units to be used in deduction=new used units−
(charged units−used units)

The OCS acknowledges the reception of the CCR message by sending CCA message with CC-Request-Type indicating TERMINATION_REQUEST (possibly Cost-Information indicating the cumulative cost of the service and Remaining-Balance are included in the Credit-Control-Answer message) in step 365.

Figure 4:
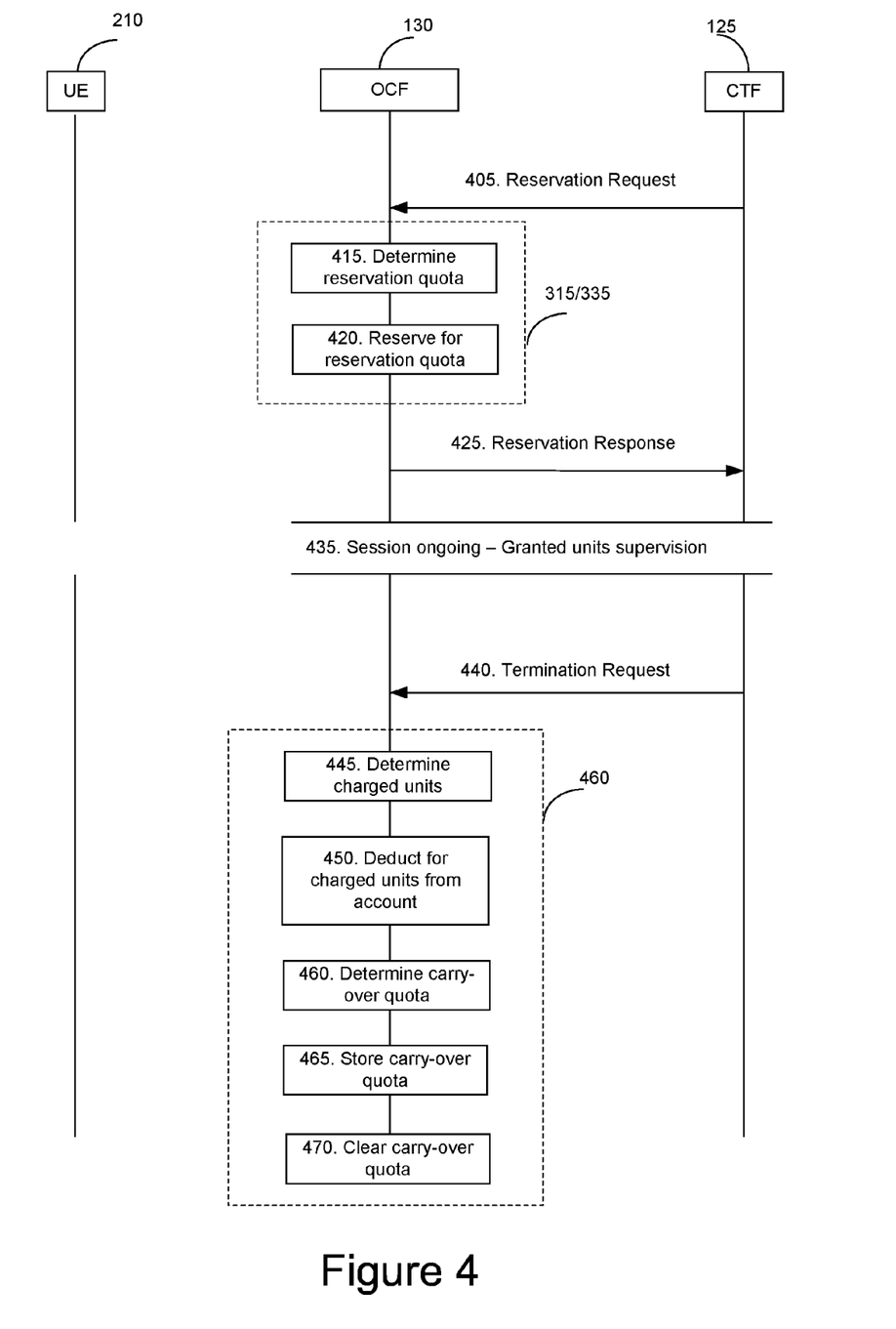
FIG. 4 is a message sequence chart showing a method for controlling service charging session for charging service usage according to a first exemplary embodiment of the invention.

FIG. 4 is a message sequence chart showing a method for controlling service charging session for charging service usage according to a first exemplary embodiment of the invention.

A service charging session is an OCS session which takes place within a charging session. The charging service session corresponds to a traffic flow. This may correspond to the service usage using a data connection plus an associated QHT (where applicable). The charging service session may also correspond to e.g. a voice call where the charging service session incorporates the charging session. For data traffic a charging session in the OCS corresponds to a data bearer, e.g. a PDP Context, at the client. Thus, for a voice call a service charging session would equal a charging session and for a data connection the service usage would correspond to the data bearer. Service usage is the traffic flow, i.e. service usage, in the charging client, e.g. a PCEF The charging session is started as a result of a request from the charging client, for example PCEF. At this point a charging session state is created. The charging session state is used as a container for any future surviving session states. This to support parallel charging sessions but also so that one service charging session in one charging session does not affect a service charging session in the same charging session.

In one possible implementing the charging protocol used for communication between the CTF and the OCS is the IETF RFC 4006. In such case the mechanisms used for the service charging session may be an Internet Engineering Task Force Multiple Services Credit Control sub-session. A useful extension of RFC 4006 is 3GPP 32.299 V10.1.0 (2011-03) introducing for example a QHT AVP.

The service charging session is started as a result of a request from the charging client, for example PCEF, in step 405 which contains a request for grant of Reservation Service Unit Quota (RSUQ). The request includes data identifying an account to charge for the service usage. The account may belong to the subscriber involved in the service provided by the client or an account of another subscriber determined by the OCS. A surviving session state is created.

Step 415 together with step 420 describes in further detail the charging control carried on in step 315 and 335 of FIG. 3. In step 415 the RSUQ is determined. The granted RSUQ can be determined from the received request (decentralized unit determination) or be determined by the OCF (centralized unit determination) and this RSUQ is then reserved for from the account in step 420. Normally a monetary value is reserved from the account by rating the RSUQ.

A reservation response is returned from the OCF to the CTF in step 425. The session is then ongoing and the CTF is supervising the session in step 435 so that the granted RSUQ is not exceeded.

The service session may be terminated because the units of a final reservation emptying the account have been consumed. The session may also be terminated because the user has ended its service usage, e.g. made an on-hook during a voice call. In this scenario, however, it is assumed that in step 440 a termination request including the used number of service units is received from the CTF because a QHT in the CTF has expired due to an idle period.

In step 445 the number of units to charge for is determined. For example a subscriber is charged 1.50€ /minute for every started minute. The user then talks for 1.5 minutes resulting in that 2 minutes should be deducted for from the account. The 2 minutes are rated in step 450 resulting in a cost of 3€ which is deducted from the account.

To make the charging of the usage not affected by the optimization done by using the Quota-Holding-Time parameter a CSU quota is determined in step 460 by determining the difference between units charged for and deducted in step 450, and the units actually used. In the present example the charged deduction in step 450 resulted in a CSU quota of 0.5 minutes, i.e. the remainder between the 2 minutes charged for and the 1.5 minute consumed by the user.

Step 460 may also include determining a rule for accessing the CSU quota. In one example rule, the rule includes a timer value so that access to the CSU quota is only to be allowed if the timer is unexpired.

To allow for reducing the excess charging due to the difference between used units and units charged for the determined CSU quota are stored with the surviving session state. The CSU quota may also be preserved by storing the used units and charged for units such that the CSU's may be computed. Thus, in step 465 data is stored in the surviving session state in association with the account such that the CSU quota based on difference between the charged amount of service units and the used amount of service units can be determined. Also, the determined rule for accessing the CSU quota may be stored in association with the account.

The CSU's may have a rule associated with them so that the units may be reserved for certain usage or services, for example that CSU's from international calls cannot be used for national calls etc.

In an optional implementation it is possible to reset the surviving session state with some interval to handle the case when subscriber is always connected, for example each midnight or every hour. It is possible to configure for how long the service can be unused before the reset is done. To cater for this a timer is introduced, called StateTimer. The StateTimer is started to handle when the values in surviving session state should be cleared. The end time of the timer could thus be set to either duration (e.g. in one hour) or specified time (e.g. midnight). In step 470 such StateTimer times out and values in the surviving session state are cleared.

Figure 5:
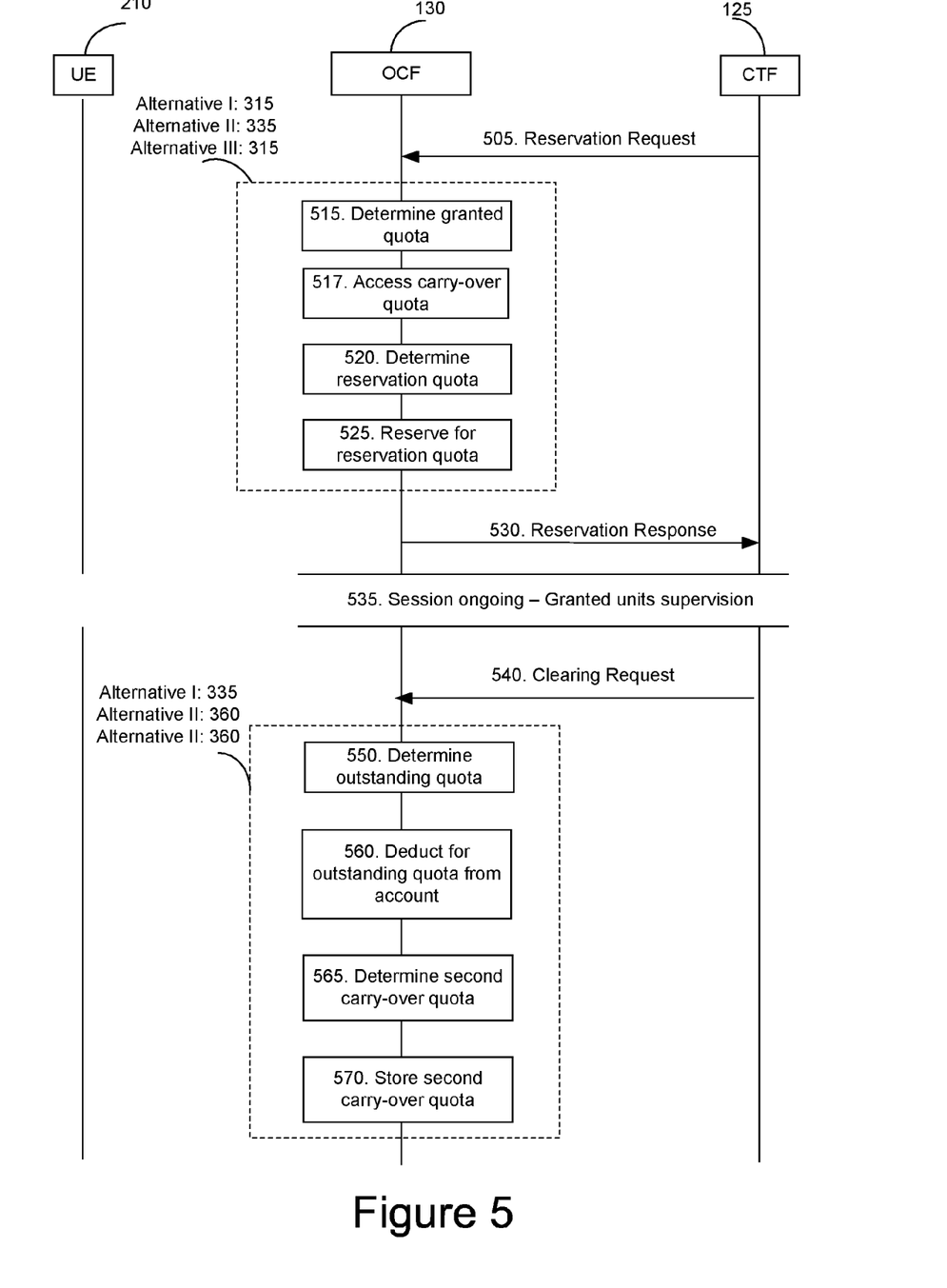
FIG. 5 is a message sequence chart showing a method for controlling service charging session for charging service usage according to a second exemplary embodiment of the invention.

FIG. 5 is a message sequence chart showing a method for controlling service charging session for charging service usage according to a second exemplary embodiment of the invention.

FIG. 5 shows scenarios applicable for three different scenarios. In alternative I a first interrogation is followed by an intermediate interrogation wherein steps 515-525 corresponds to step 315 and steps 550-570 corresponds to step 335. In alternative II an intermediate interrogation is followed by a final interrogation wherein steps 515-525 corresponds to step 335 and steps 550-570 corresponds to step 360. In alternative III a first interrogation is followed by a final interrogation wherein steps 515-525 corresponds to step 315 and steps 550-570 corresponds to step 360.

In step 505 a request for grant of a RSUQ from a charging client is received. The request message includes data identifying an account to charge for the service usage as well as other session related parameters. The account may belong to the subscriber involved in the service provided by the client or an account of another subscriber determined by the OCS. This does not necessarily be the same account as determined in step 505 of FIG. 5.

A granted service unit quota for the request is determined in step 515. The granted service unit quota can be determined from the received request (decentralized unit determination) or it can be determined by the OCS (centralized unit determination).

A CSU quota is accessed from a previous service charging session state or charging session state associated with the identified account in step 517. The used units' and the charged units' values are fetched from the session state. If access rules are associated with the CSU's a check is made for such rules and the CSU quota is only accessed if allowed by such rules. In one example the rule includes a timer and the CSU quota is only accessed if the timer is unexpired.

In step 520 an RSUQ is determined by deducting the accessed CSU quota from the granted service unit quota. The reservation may be smaller than the granted service unit quota because the CSU quota has been deducted (i.e. charged for) earlier and need not to be reserved for. The amount of units used in the new reservation is calculated in the following formula:

Units to be used in reservation=new requested units−(charged units−used units)

Reservation for the RSUQ from the account is performed in step 525. Normally a monetary value calculated by rating the RSUQ is reserved from the account.

In step 530 the granted service unit quota is sent to the charging client. The sending of the granted service unit quota may include sending also a quota holding time parameter.

The session is ongoing and the CTF is supervising the consumption of granted units in step 535.

In step 540 a clearing request is received from the charging client including data enabling a first used amount of service units to be determined. The clearing request may be received following a quota holding time expiry at the CTF when service usage has ended. Service usage may comprise a data service usage including any of a data bearer, IP bearer, IP flow, service data flow, or a voice call. Thus, the clearing request may constitute for example a final interrogation after the service usage is released. The clearing request may also constitute an intermediate interrogation wherein a new quota is requested. The clearing request may also constitute an intermediate interrogation terminating one or several service charging sessions eg. MSCCs. One cause of a final interrogation terminating the service session is may be that the data bearer is terminated.

The amount of units used in the deduction is calculated in step 550. An Outstanding Service Unit (OSU) quota is determined by deducting the CSU quota from the used amount of service units. The following formula is useful:

OSU quota to be used in deduction=new used units−
(charged units−used units)

The OSU quota is deducted for from the account in step 560.

In step 565 a CSU quota based on the difference between the OSU quota and the amount of service units deducted for is determined. The CSU quota is stored in association with the account in step 570. Generally, it is determined and stored data in association with the account such that the CSU quota based on difference between the OSU quota and the amount of service units deducted for can be determined.

If the use of CSU's is not allowed between charging sessions the surviving session state may now be cleared or deleted.

A present service charging session using a CSU quota and a previous service charging session creating a CSU quota may relate to the same charging session or they may related to separate charging sessions.

Figure 6:
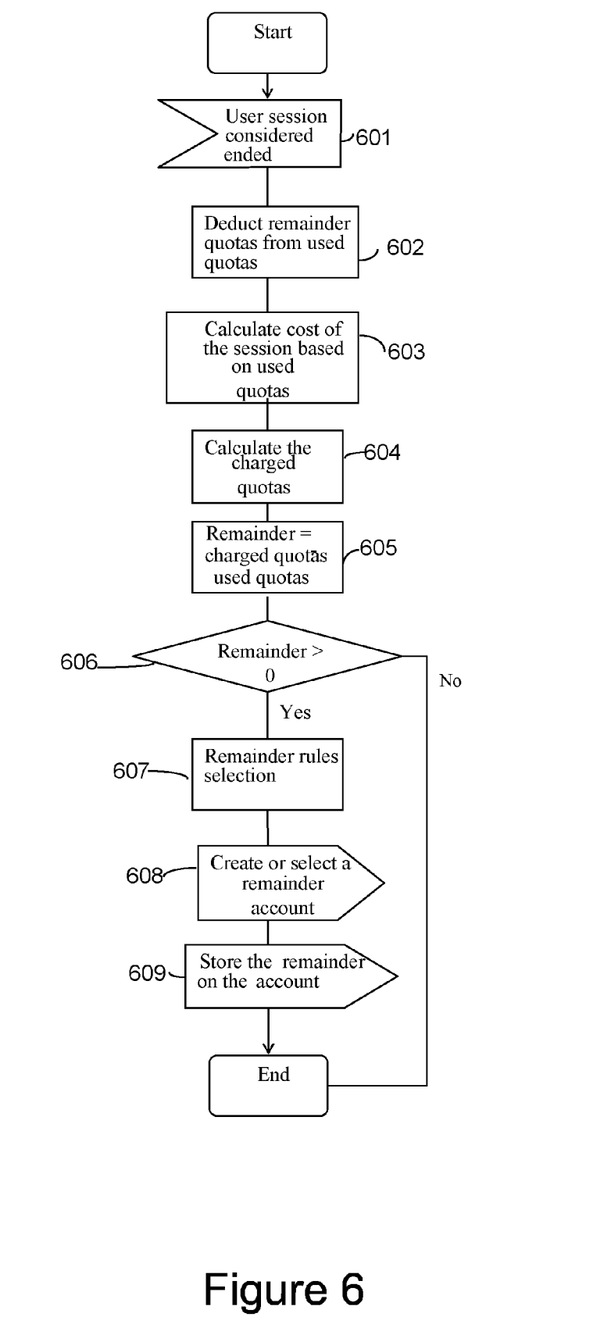
FIG. 6 is a flow chart showing a method for controlling charging according to an exemplary embodiment of the invention.

FIG. 6 is a flow chart showing a method for controlling charging according to an exemplary embodiment of the invention.

At the end of a normal session the following steps are performed:

In step 601 the session is considered ended and the used quotas are received. In step 602 it is checked if there is any applicable remainder quota and these are deducted these from the used quotas. Then, in step 603 it is calculated the cost based on the used quotas (with the quotas from the remainder deducted). This may happen during the session. A reverse calculation is performed in step 604 to calculate the quotas that the cost would be give the user i.e. charged quotas. In step 605 deducting the charged quotas from the used quotas to get the unused quotas or remainder are done. If the remainder is above 0 then the result is to be stored in a specific account in step 606. In step 607 it is selected and setup rules for using the remainder based on the type of session e.g. data or voice, location restriction, time restrictions. In step 608 it is selected or created a remainder account with a matching restriction. Step 609 stores the remainder and set the StateTimer on the remainder account.

Figure 7:
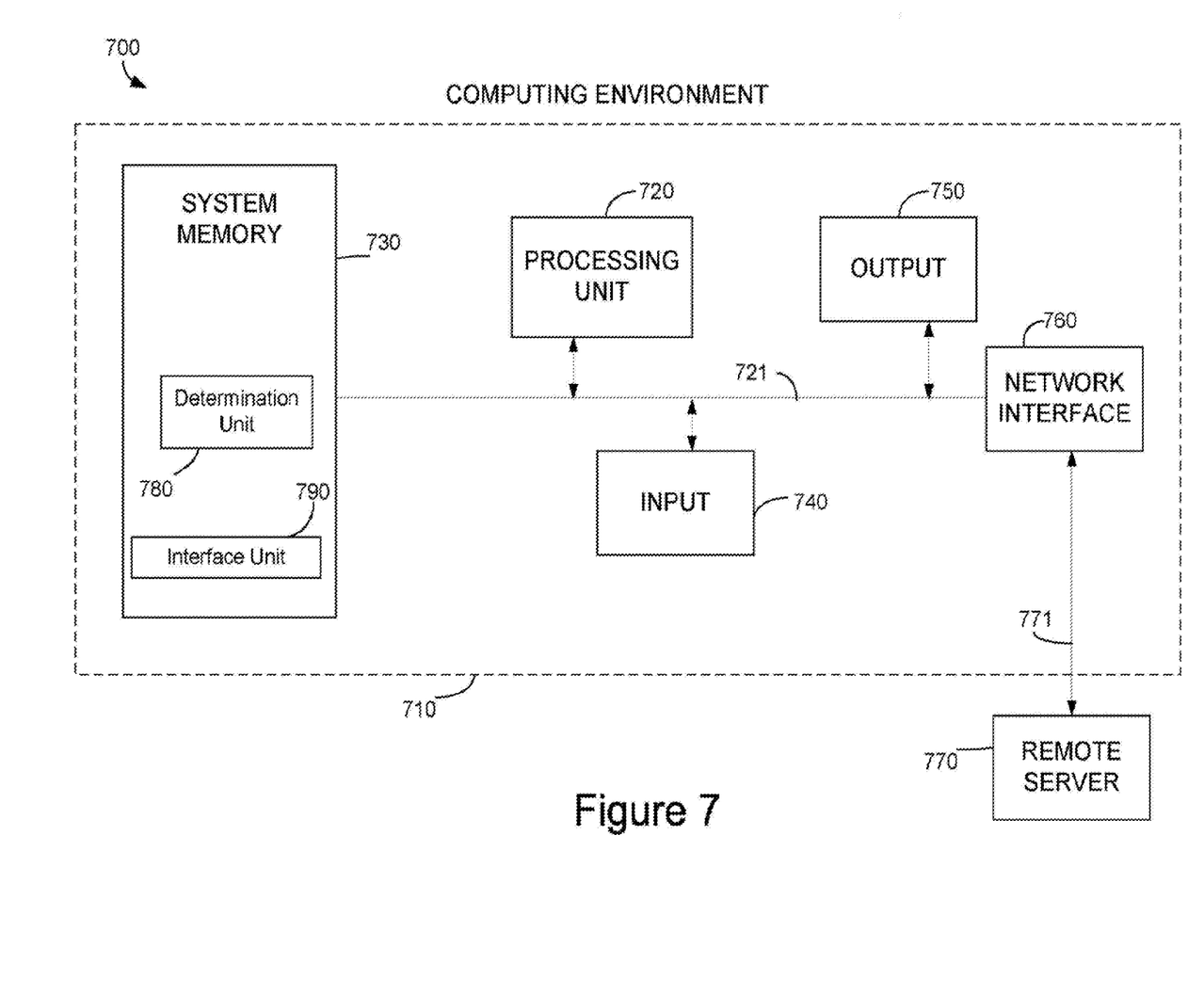
FIG. 7 is a block diagram showing an exemplary computing device for implementing a charging control node for controlling a present service charging session for charging service usage in a communication network in the form of computing system environment 800.

FIG. 7 is a block diagram showing an exemplary computing device for implementing a charging control node for controlling a present service charging session for charging service usage in a communication network in the form of computing system environment 700.

Although as made clear above, the computing system environment 700 is only one example of a suitable computing environment for an OCS and is not intended to suggest any limitation as to the scope of use or functionality of the claimed subject matter. Further, the computing environment 700 is not intended to suggest any dependency or requirement relating to the claimed subject matter and any one or combination of components illustrated in the example operating environment 700.

An example of a device for implementing the previously described innovation includes a general purpose computing device in the form of a computer 710. Components of computer 710 can include, but are not limited to, a processing unit 720, a system memory 730, and a system bus 721 that couples various system components including the system memory to the processing unit 720. The system bus 721 can be any of several types of bus structures including a memory bus or memory controller, a peripheral bus, and a local bus using any of a variety of bus architectures.

Computer 710 can include a variety of computer readable media. Computer readable media can be any available media that can be accessed by computer 710. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media can embody computer readable instructions, data structures, program modules or other data in a modulated data signal such as a carrier wave or other transport mechanism and can include any suitable information delivery media.

The system memory 730 can include computer storage media in the form of volatile and/or nonvolatile memory such as read only memory (ROM) and/or random access memory (RAM). A basic input/output system (BIOS), containing the basic routines that help to transfer information between elements within computer 710, such as during start-up, can be stored in memory 730. Memory 730 can also contain data and/or program modules that are immediately accessible to and/or presently being operated on by processing unit 720. By way of non-limiting example, memory 730 can also include an operating system, application programs, other program modules, and program data.

In one embodiment the Interface Unit 790 is a software module loaded in the memory and processable by the processing unit, adapting the charging control node for receiving a first request for grant of a reservation service unit quota from a charging client, the first request including at least data identifying an account to charge for the service usage. The Determination Unit 780 is a software module loaded in the memory and processable by the processing unit adapting the charging control node for: determining a first granted service unit quota for the first request; accessing a first carry-over service unit quota from a previous service charging session associated with the identified account; determining a first reservation service unit quota by deducting the first carry-over service unit quota from the first granted service unit quota; reserving for the first reservation service unit quota from the account. The interface unit software module is further adapting the charging control node for sending the first granted service unit quota to the charging client and receiving a clearing request from the charging client including data enabling a first used amount of service units to be determined. The determination unit is further adapting the charging control node for determining an outstanding service unit quota by deducting the first carryover service unit quota from the first used amount of service unit and deducting for the outstanding service unit quota from the account.

The computer 710 can also include other removable/non-removable and volatile/nonvolatile computer storage media. For example, computer 710 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 721 through a non-removable memory interface such as an interface, and a magnetic disk drive or optical disk drive can be connected to the system bus 721 by a removable memory interface, such as an interface.

A user can enter commands and information into the computer 710 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 720 through user input 740 and associated interface(s) that are coupled to the system bus 721, but can be connected by other interface and bus structures, such as a parallel port, game port or a universal serial bus (USB).

A graphics subsystem can also be connected to the system bus 721. In addition, a monitor or other type of display device can be connected to the system bus 721 through an interface, such as output interface 750, which can in turn communicate with video memory. In addition to a monitor, computers can also include other peripheral output devices, such as speakers and/or printing devices, which can also be connected through output interface 750.

The computer 710 can operate in a networked or distributed environment using logical connections to one or more other remote computers, such as remote server 770, which can in turn have media capabilities different from device 710. The remote server 770 can be a personal computer, a server, a router, a network PC, a peer device or other common network node, and/or any other remote media consumption or transmission device, and can include any or all of the elements described above relative to the computer 710. The logical connections depicted in FIG. 7 include a network 771, such as a local area network (LAN) or a wide area network (WAN), but can also include other networks/buses.

When used in a LAN networking environment, the computer 710 is connected to the LAN 771 through a network interface 760 or adapter. When used in a WAN networking environment, the computer 710 can include a communications component, such as a modem, or other means for establishing communications over a WAN, such as the Internet. A communications component, such as a modem, which can be internal or external, can be connected to the system bus 721 through the user input interface at input 740 and/or other appropriate mechanism.

In a networked environment, program modules depicted relative to the computer 710, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of various exemplary combinations and sub-combinations of embodiments and of the manner and process of making and using them, and shall support claims to any such combination or sub-combination.

Many variations and modifications can be made to the embodiments without substantially departing from the principles of the present invention. All such variations and modifications are intended to be included herein within the scope of the present invention.

The before mentioned excess-charging will be removed by remembering the usage between the service charging sessions within the same charging session or between charging sessions.

The remembered, i.e. stored, usage is accessible by the OCS and used within a subsequent service charging session or charging session.

For example a subscriber is charged 1.50€ /minute for every started minute. The user then talks for 1.5 minutes this would result in a remainder of 30 seconds. A calculation would give for example that the cost for the 1 minute is 1.50+cost for the 0.5 minute i.e. 1.50 gives a total cost of 3€ . Taking 3/1.50 gives 2 minutes and the remainder (or unused quota) is then 2−1.5 which is 0.5 minutes or 30 seconds.

The unused quota may have a rule associated with them so that quota that is for example for international calls cannot be used for national calls etc.

Several types of entity relationships are possible. A user may have a plurality of accounts as well as a plurality of carry-over service units balances associated with it. A carry-over service unit's balance may have a plurality of usage rules associated with it.

The total usage for all service sessions for one service during the charging session is considered. The charged but not used units are deducted from the usage for next service session for that service. This is done by having a surviving service state for the total charging session that survives the termination of the service session. In this continues session state the total usage and charged usage may be included.

The surviving session state is for one unique charging session to be able to support parallel charging sessions without interference between the charging sessions.

The invention claimed is:

1. A method performed by a charging control node for controlling a present service charging session for charging service usage in a communication network, said method comprising the steps of:
receiving a first request for grant of a reservation service unit quota from a charging client, the first request including at least data identifying an account to charge for the service usage;
determining a first granted service unit quota for the first request;
accessing a first carry-over service unit quota from a previous service charging session associated with the identified account;
determining a first reservation service unit quota by deducting the first carry-over service unit quota from the first granted service unit quota;
reserving for the first reservation service unit quota from the account;
sending the first granted service unit quota to the charging client;
receiving a clearing request from the charging client including data enabling a first used amount of service units to be determined;
determining an outstanding service unit quota by deducting the first carry-over service unit quota from the first used amount of service unit; and
deducting for the outstanding service unit quota from the account.

2. The method according to claim 1, wherein the method includes, before the step of receiving the first request for grant of a service unit quota, the further steps of:
receiving a second request for grant of a reservation service unit quota from the charging client, the second request including at least data identifying an account to charge for the service usage;
determining a second reservation service unit quota for the second request;
reserving for the second reservation service unit quota from the account;
sending the second reservation service unit quota to the charging client;
receiving a service usage termination message including data enabling a second used amount of service units to be determined;
determining a second charged amount of service units by rounding up the first used amount of service units to a predefined resolution of service units;
deducting for the second charged amount of service units from the account; and
storing data in association with the account such that the first carry-over service units quota based on difference between the second charged amount of service units and the second used amount of service units can be determined.

3. The method according to claim 2, wherein the step of storing data in association with the account includes determining a rule for accessing the first carry-over service units quota and where the step of accessing further includes accessing the first carry-over service units quota in accordance with the rule.

4. The method according to claim 3, wherein the rule includes a timer and where the step of accessing in accordance with said rule includes accessing only if the timer is unexpired.

5. The method according to claim 1, wherein the method includes, after the step of deducting for the outstanding service unit quota, the further step of:
determining and storing data in association with the account such that a second carry-over service units quota based on difference between the outstanding service unit quota and the amount of service units deducted for can be determined.

6. The method according to claim 1, wherein sending the first granted service unit quota to the charging client includes sending a quota holding time parameter and wherein the clearing request is received following a quota holding time expiry.

7. The method according to claim 1, wherein the service charging session is an Internet Engineering Task Force Multiple Services Credit Control.

8. The method according to claim 1, wherein the present service charging session and the previous service charging session relate to separate charging sessions.

9. The method according to claim 1, wherein the service usage comprises a data service usage including at least one of a data bearer, IP bearer, IP flow, service data flow, or a voice call.

10. A charging control node for controlling a present service charging session for charging service usage in a communication network comprising:
an interface unit configured to receive a first request for grant of a reservation service unit quota from a charging client, the first request including at least data identifying an account to charge for the service usage;
a determination unit configured to:
determine a first granted service unit quota for the first request;
access a first carry-over service unit quota from a previous service charging session associated with the identified account;
determine a first reservation service unit quota by deducting the first carry-over service unit quota from the first granted service unit quota; and
reserve for the first reservation service unit quota from the account;
wherein the interface unit is further configured to:
send the first granted service unit quota to the charging client;
receive a clearing request from the charging client including data enabling a first used amount of service units to be determined; and
wherein the determination unit is further configured to:
determine an outstanding service unit quota by deducting the first carry-over service unit quota from the first used amount of service unit; and
deduct for the outstanding service unit quota from the account.

11. The charging control node according to claim 10, wherein, in response to receiving a second request for grant of a reservation service unit from the charging client, said second request including at least data identifying an account to charge for the service and being received via the interface unit in advance of the first request, the determining unit is configured to:
determine a second reservation service unit quota for the second request, and reserve for the second reservation service unit quota from the account;
send the second reservation service unit quota to the charging client;
receive a service usage termination message including data enabling a second used amount of service units to be determined;
determine a second charged amount of service units by rounding up the first used amount of service units to a predefined resolution of service units;
deduct for the second charged amount of service units from the account; and
store data in association with the account such that the first carry-over service units quota can be determined based on a difference between the second charged amount of service units and the second used amount of service units.

12. The charging control node according to claim 11, wherein the determining unit is configured to determine a rule for accessing the first carry-over service units quota, and to access the first carry-over service units quota in accordance with the rule.

13. The charging control node according to claim 10, wherein, after deducting for the outstanding service unit quota, the determining unit is configured to determine and store data in association with the account such that a second carry-over service units quota can be determined based on a difference between the outstanding service unit quota and the amount of service units deducted.

14. The charging control node according to claim 10, wherein the service charging session is an Internet Engineering Task Force Multiple Services Credit Control.

15. The charging control node according to claim 10, wherein the present service charging session and the previous service charging session relate to separate charging sessions.

16. A non-transitory computer-readable medium storing a computer program comprising instructions that, when executed by a processor in a charging control node, causes the charging control node to control a present service charging session for charging service usage in a communication network, based on the computer program including program instructions causing the charging control node to:
receive a first request for grant of a reservation service unit quota from a charging client, the first request message including at least data identifying an account to charge for the service usage;
determine a first granted service unit quota for the first request;
access a first carry-over service unit quota from a previous service charging session associated with the identified account;
determine a first reservation service unit quota by deducting the first carry-over service unit quota from the first granted service unit quota;
reserve for the first reservation service unit quota from the account;
send the first granted service unit quota to the charging client;
receive a clearing request from the charging client including data enabling a first used amount of service units to be determined;
determine an outstanding service unit quota by deducting the first carry-over service unit quota from the first used amount of service unit; and
deduct for the outstanding service unit quota from the account.

17. The non-transistory computer-readable medium of claim 16, wherein the computer program further includes instructions that, in response to the charging control node receiving a second request for grant of a reservation service unit quota from the charging client in advance of receiving the first request for grant of a service unit quota, configure the charging control node to:
determine a second reservation service unit quota for the second request, wherein the second request including at least data identifying an account to charge for the service usage;
reserve for the second reservation service unit quota from the account;
send the second reservation service unit quota to the charging client;
receive a service usage termination message including data enabling a second used amount of service units to be determined;
determine a second charged amount of service units by rounding up the first used amount of service units to a predefined resolution of service units; and deduct for the second charged amount of service units from the account:
  store data in association with the account such that the first carry-over service units quota based on difference between the second charged amount of service units and the second used amount of service units can be determined.

18. The non-transistory computer-readable medium according to claim 17, wherein the computer program further comprises program instructions that, when executed by the processor of the charging control node, causes the charging control node to determine a rule for accessing the first carry-over service units quota and to access the first carry-over service units quota in accordance with said rules.

19. The non-transistory computer-readable medium according to claim 16, wherein the computer program further comprises program instructions that, when executed by the processor of the charging control node, causes the charging control node to, after deducting for the outstanding service unit quota, determine and store data in association with the account so that a second carry-over service units quota can be determined based on a difference between the outstanding service unit quota and the amount of service units deducted.

20. The non-transistory computer-readable medium according to claim 16, wherein the computer program further comprises program instructions that, when executed by the processor of the charging control node, causes the charging control node to, after deducting for the outstanding service unit quota, send and receive using Internet Engineering Task Force Multiple Services Credit Control.

* * * * *